United States Patent [19]

Bowman

[11] 4,084,064
[45] Apr. 11, 1978

[54] PARTICLE TRAP CONTACT FOR GAS INSULATED TRANSMISSION LINES

[75] Inventor: Gary K. Bowman, Westborough, Mass.

[73] Assignee: Westinghouse Electric Corporation, Pittsburgh, Pa.

[21] Appl. No.: 830,248

[22] Filed: Sep. 2, 1977

[51] Int. Cl.² ............................................. H01B 9/04
[52] U.S. Cl. .............................. 174/14 R; 174/16 B; 174/28
[58] Field of Search ................. 174/16 B, 28, 29, 111, 174/14 R, 99 B

[56] References Cited

U.S. PATENT DOCUMENTS

| | | | |
|---|---|---|---|
| 3,515,939 | 6/1970 | Trump | 174/14 R X |
| 3,767,837 | 10/1973 | Graybill | 174/16 B X |
| 3,786,174 | 1/1974 | Floessel | 174/16 B X |
| 3,813,475 | 5/1974 | Cronin | 174/16 B |
| 3,814,879 | 6/1974 | Cookson et al. | 174/14 R X |
| 4,034,147 | 7/1977 | Clark et al. | 174/14 R |

Primary Examiner—Arthur T. Grimley
Attorney, Agent, or Firm—M. S. Yatsko

[57] ABSTRACT

A gas insulated transmission line includes an elongated outer sheath at ground potential, an inner conductor disposed within the outer sheath at high electrical potential, an insulating gas electrically insulating the inner conductor from the outer sheath, and an insulating spacer insulatably supporting the inner conductor within the outer sheath. An electrically conducting particle-trapping ring is disposed within, and spaced apart form, the outer sheath between the spacer and the outer sheath. The ring and the outer sheath form a low field region therebetween for the entrapment of conducting particles therein. Means are included for electrically connecting the particle-trapping ring to the outer sheath.

10 Claims, 5 Drawing Figures

PARTICLE TRAP CONTACT FOR GAS INSULATED TRANSMISSION LINES

BACKGROUND OF THE INVENTION

This invention relates generally to gas-insulated equipment, and more particularly to a contact for electrically connecting a particle-trapping ring with the outer sheath of a gas-insulated transmission line.

Gas-insulated transmission lines are being used on an ever increasing scale in recent years due to the desirability of increasing safety, problems in acquiring right-of-way for overhead lines, higher power lines required by growing metropolitan areas, and the growing demands for electrical energy. Compressed gas-insulated transmission lines typically comprise a hollow outer sheath, an inner conductor disposed within the outer sheath, a plurality of solid insulating spacers which support the conductor in the sheath, and a compressed gas such as sulfur hexafluoride or the like in the sheath to electrically insulate the conductor from the sheath. Gas barriers may be provided at intervals along the length of the assembly to provide isolation between various segments of the transmission line.

One problem occurring in the use of gas-insulated transmission lines concerns the mobile conducting or semi-conducting particle. These particles, which may enter the line during the fabrication of the line or during installation in the field, cause problems in that they may lower the dielectric strength of the insulating gas and may initiate flash-over and breakdown of the gas as they travel between the outer sheath and the inner conductor. Trump, in U.S. Pat. No. 3,515,939, disclosed a means for deactivating and eliminating the deleterious effects of such conducting particles. In that patent, Trump describes the use of electrodes placed inside the outer sheath to create low field regions which trap and deactivate the particles. Whenever a particle enters the low field region, it cannot acquire sufficient force to propel it out of the region, and thus is trapped in the low field region so that it cannot initite breakdown of the line.

One of the simpliest and most economical means for providing the particle-trapping low field region is to place a ring within the outer sheath which is spaced apart therefrom. This ring typically would have apertures or slots in the bottom regions thereof to facilitate the entrance of conducting particles into the low field region between the ring and the outer sheath. However, to achieve the low field region, the ring must be electrically connected to, and at the same potential as, the outer sheath. This connection of the particle-trapping ring to the outer sheath has, in the past, been through a leaf contact which was physically secured to the ring and which was in sliding contact with the outer sheath. Recently, however, difficulties have been experienced with the use of the leaf contacts. Excessive wear on the contact and the sheath have been observed, and this erosion was sufficient to produce a gap which could insulate the voltage capacitively coupled to the particle trapping ring. Also, the erosion process created a deposit of very fine gray powder which collected along the outer sheath. Additionally, the low force exerted by the leaf spring contact, which is on the order of 0.5 pounds, is insufficient to push the contact through tarnished or oxide layers.

SUMMARY OF THE INVENTION

In accordance with this invention, it has been found that a more desirable gas insulated transmission line is provided which comprises an elongated cylindrical outer sheath at low potential, an elongated inner conductor disposed within the outer sheath, an insulating gas electrically insulating the inner conductor from the outer sheath, and an insulating spacer insulatably supporting the inner conductor within the outer sheath. An electrically-conducting particle-trapping ring is disposed within, and spaced apart from the outer sheath intermediate the spacer and the outer sheath. Means are provided for electrically connecting the particle-trapping ring and the outer sheath, and these electrical connecting means include an electrically-conducting retaining cup electrically connected to the ring, a holding member disposed within the retaining cup and extending outwardly to the outer sheath, and a first spring disposed within the retaining cup and exerting a force against the holding member so as to hold the holding member against the outer sheath. A contact button is disposed within the retaining cup and extends outwardly to the outer sheath. An electrically-conducting spring is disposed within the retaining cup and contacts both the retaining cup and the contact button, with the spring exerting a force against the contact button to hold it against the outer sheath. Electrical connection between the outer sheath and the particle-trapping ring is through the contact button, the spring associated therewith, and the electrically-conducting retaining cup.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
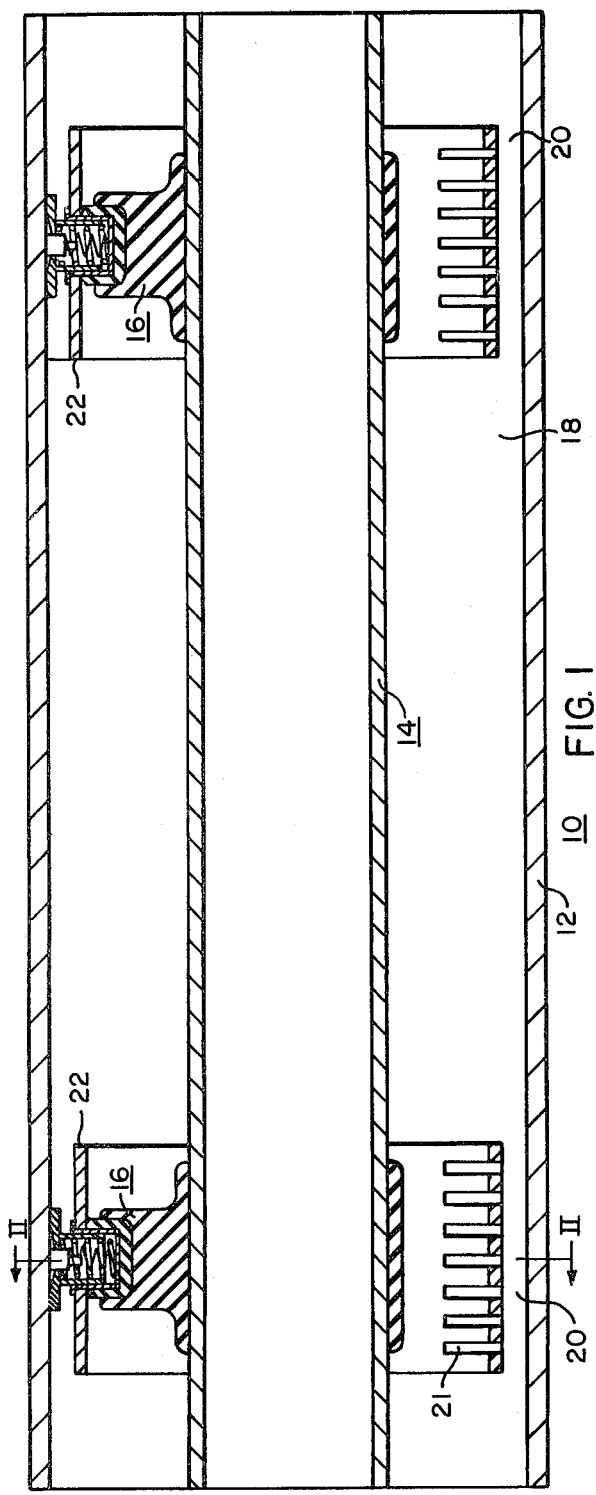
FIG. 1 is an elevational view of a typical gas insulated transmission line.
Figure 2:
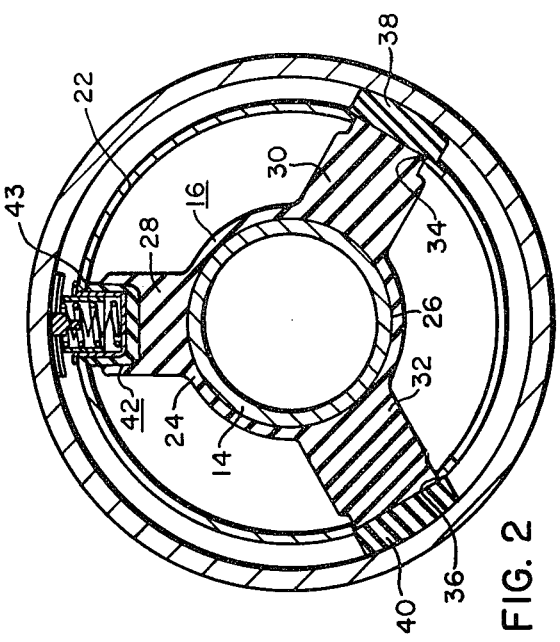
FIG. 2 is an end view taken along line II—II of FIG. 1.

A gas-insulated transmission line 10 utlizing the teachings of this invention is illustrated in FIGS. 1 and 2, Therein it is shown that the tranmission line 10 is comprised of an elongated, cylindrical outer sheath 12, and an elongated inner conductor 14 disposed within the outer sheath 12. The outer sheath 12 will typically be at low or ground electrical potential, whereas the inner-conductor 14 will be at high electrical potential with respect to the outer sheath 12, and may typically carry voltages in the range 138–800 k.V. Insulatably supporting the inner conductor 14 within the outer sheath 12 are a plurality of insulating spacers 16, and electrically insulating the inner conductor 14 from the outer sheath 12 is an insulating gas 18 typical of which is sulfur hexafluoride at pressures of 50 pounds per square inch gauge. Providing low field regions 20 adjacent to the insulating spacers 16 are a particle-trapping rings 22. Apertures 21 in the ring 22 facilitate entry of particles into the low field region 20. The inner conductor 14, the outer sheath 12, and the particle-trapping rings 22 will typically be of good electrically-conducting material such as aluminum.

As can be seen from FIG. 2, the insulating spacer 16 is preferably of a tri-post design, although the invention may be utilized with disc or conically-shaped insulators. The tri-post insulator 16 illustrated is comprised of a central portion 24 having a bore 26 therethrough through which extends the inner conductor 14. Extending outwardly from the central member 24 to the particle-trapping ring 22 are three legs 28, 30, 32. The legs 30, 32, extend outwardly to openings 34, 36 respectively in the particle-trapping ring 22, and nylon bearings 38, 40 are secured to the legs 30, 32 respectively so as to support the legs 30, 32 and to provide for sliding of the spacer 16 within the outer sheath 12 upon thermal expansion of the inner conductor 14.

In order to provide the low field region 20 between the particle-trapping ring 22 and the outer sheath 12, it is necessary to maintain electrical contact between the particle-trapping ring 22 and the outer sheath 12. This electrical contact is made through the particle-trapping contact 42, illustrated in more detail in FIG. 3, which is secured to leg 28 of the insulating spacer 16, and extends through the contact opening 43 in the ring 22. The leg 28 has a cavity 44 therein, and a metal insert 46 is disposed within this cavity 44. Disposed within the insert 46 is a retaining cup 48 which is of a good electrically-conducting material. The retaining cup 48 is in electrical contact with the particle-trapping ring 22. Disposed within the retaining cup 48 is a holding member 50 which is of a low-friction material such as nylon or TEFLON. The holding member 50 extends outwardly from the retaining cup 48 and contacts the outer sheath 12. The holding member 50 has an opening 52 therein, which opening 52 is in the form of a longitudinally-extending groove which may be countersunk to catch and contain any particles which may be produced, and which also prevents wiping of the lubricated area. A spring 54 is disposed within the retaining cup 48, and contacts the holding member 50 so as to exert a force against the holding member 50 so that the holding member 50 is held against the inner surface of the outer sheath 12.

Disposed within the retaining cup 48, and extending through the holding member opening 52 to the outer sheath 12, is a contact button 56. The contact button 56 is made of a low friction, self-lubricating, low resistance material such as a copper-graphite alloy. The contact button 56 is held in contact with the outer sheath 12 by a separate, high pressure spring 58 which likewise is disposed within the retaining cup 48 and contacts both the retaining cup 48 and the contact button 56. The spring 58 exerts a force against the contact button 56 which preferably is on the order of 10 pounds, but which, depending upon the exact fit of the spacer 16 in the outer sheath 12, may vary from 6 to 12 pounds.

The electrical connection between the outer sheath 12 and the particle-trapping ring 22 is made by the contact button 56 contacting the outer sheath 12, the spring 58, of a good electrically-conducting material such as stainless steel, contacting both the contact button 56 and the retaining cup 48, and through the retaining cup 48 to the particle-trapping ring 22. Because of the relatively high pressure of the spring 58, good electrical contact between the outer sheath 12 and the contact button 56 is maintained even with a tarnish or oxide layer therebetween. Also, the use of the spring 58 applies a known force against the contact button 56 and the outer sheath 12, unlike the prior art leaf spring system where the force was variable subject to variation in assembly.

Figure 3:
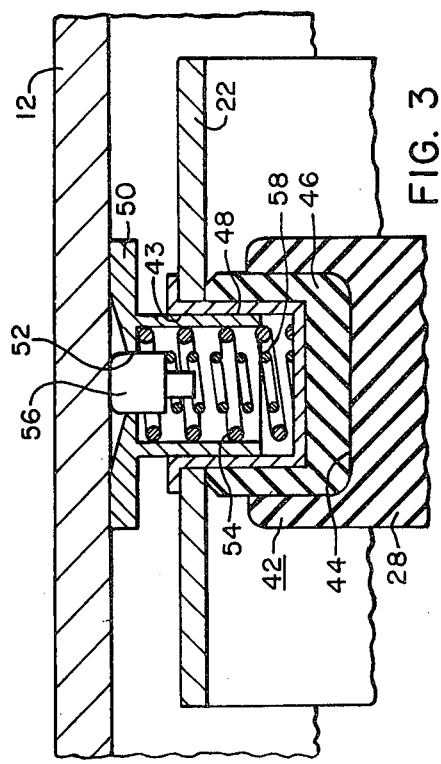
FIG. 3 is a detailed view of the particle-trapping ring contact.
Figure 4:
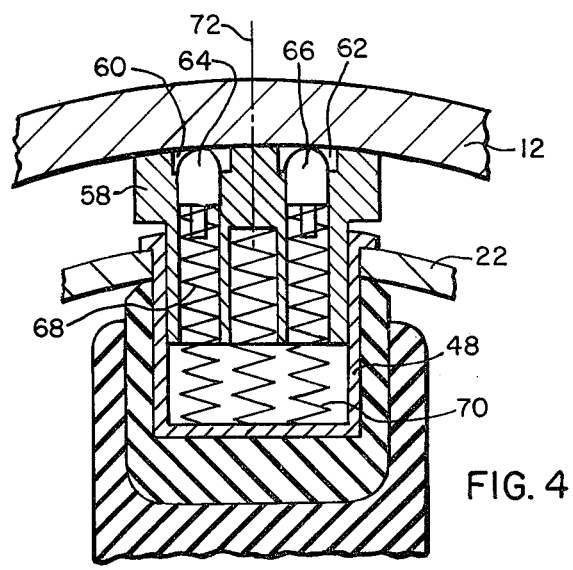
FIG. 4 is a modification of the view of FIG. 3.
Figure 5:
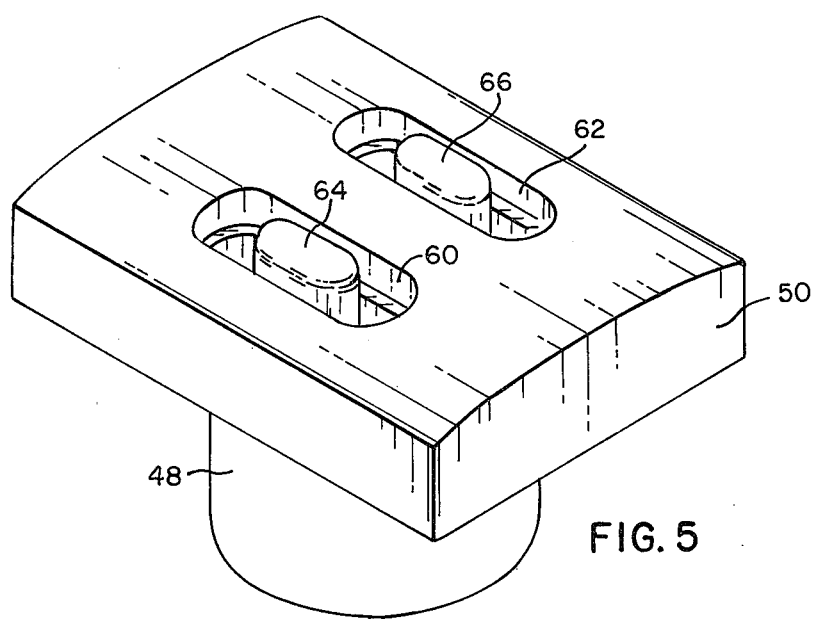
FIG. 5 is an isometric view of the particle-trapping contact.

A modification of the particle-trapping contact 42 illustrated in FIG. 3 is shown in FIG. 4. In this modification, there are present two openings 60, 62 in the holding member 50, and two contact buttons 64, 66 extend through the openings 60, 63 respectively. Two high pressure springs 68, 70 are utilized to exert a force (6–12 pounds) against the contact buttons 64, 66 to ensure that the contact buttons 64, 66 remain in electrical contact with the outer sheath 12, and also provide an electrical connection between the contact buttons 64, 66 and the remaining cup 48. This modification provides a redundancy in connecting the outer sheath 12 to the particle-trapping ring 22, for in the event one of the contact buttons 64, 66 fails to contact the outer sheath 12, the other contact button 64 or 66 can provide the necessary electrical connection. When utilizing the two contact buttons 64, 66 as shown is FIG. 4, these contact buttons 64, 66 should preferably be oriented with their center line 7 perpendicular to the transmission line longitudinal axis to eliminate any possible induced electrical loops. To then ensure positive orientation of the contact buttons 64, 66 the holding member 50 should preferably then be rectangularly shaped, as illustrated in FIG. 5, so that the possibility of inadvertent misorientation is eliminated.

Thus, it can be seen that this invention provides an improved gas-insulated transmission line which contains an improved connection means between the outer sheath and the particle-trapping ring disposed therein.

What is claimed is:

1. A gas-insulated transmission line comprising:
   an elongated cylindrical outer sheath at low electrical potential,
   an elongated inner conductor disposed within said outer sheath and at high electric potential with respect to said outer sheath;
   an insulating gas disposed within said outer sheath and electrically insulating said inner conductor from said outer sheath;
   an insulating spacer insulatably supporting said inner conductor within said outer sheath;
   an electrically-conducting particle-trapping ring disposed within, and spaced-apart from, said outer sheath intermediate said spacer and said outer sheath, said ring and said outer sheath forming a low field region therebetween for the entrapment of particles therein, said ring having a contact opening therein; and
   means for electrically connecting said ring and said outer sheath comprising:
   an electrically-conducting retaining cup disposes within said ring contact opening and electrically connected to said ring;
   a holding member disposed within said retaining cup and extending outwardly to said outer sheath, said holding member having an opening therein;
   a first spring disposed within said retaining cup and contacting said holding member, said spring exerting a force against said holding member to hold said holding member against said outer sheath;
   a contact button disposed within said retaining cup and extending outwardly through said holding member opening to said outer sheath; and an electrically-conducting second spring disposed within said retaining cup and contacting said retaining cup and said contact button, said second spring exerting a force against said contact button to hold said contact button against said outer sheath.

2. The gas-insulated transmission line according to claim 1 wherein said contact button is made of a low friction, self-lubricating, low resistance material.

3. The gas-insulated transmission line according to claim 2 wherein said contact button material is a copper-graphite alloy.

4. The gas-insulated transmission line according to claim 1 wherein said holding member opening is a longitudinally-extending groove.

5. The gas-insulated transmission line according to claim 1 wherein said second spring exerts a force of at least six pounds against said contact button.

6. The gas-insulated transmission line according to claim 1 wherein said spacer has a cavity therein, and said retaining cup is disposed in said spacer cavity.

7. The gas-insulated transmission line according to claim 1 wherein said spacer has a cavity therein, a spacer insert is disposed within said spacer cavity, and said retaining cup is disposed within said spacer insert.

8. The gas-insulated transmission line according to claim 1 including two holding member openings, two contact buttons extending through said holding member openings, and two second springs holding said contact buttons against said outer sheath.

9. The gas-insulated transmission line according to claim 8 wherein said contact buttons are oriented with their center line perpendicular to the transmission line longitudinal axis.

10. The gas-insulated transmission line according to claim 1 wherein said inner conductor, said outer sheath, and said ring are made of aluminum, said insulating gas comprises sulfur hexafluroride, and said ring has a plurality of particle-trapping apertures therein.

* * * * *